United States Patent [19]

Burgyan

[11] Patent Number: 4,625,246

[45] Date of Patent: Nov. 25, 1986

[54] CONTROL CIRCUIT FOR TAPE RECORDERS

[75] Inventor: Lajos Burgyan, Palo Alto, Calif.

[73] Assignee: Signetics Corporation, Sunnyvale, Calif.

[21] Appl. No.: 593,785

[22] Filed: Mar. 27, 1984

[51] Int. Cl.[4] .............................................. G11B 15/12
[52] U.S. Cl. ......................................... 360/62; 360/61
[58] Field of Search ...................... 360/61, 62, 65, 67, 360/68

[56] References Cited

U.S. PATENT DOCUMENTS

| | | | |
|---|---|---|---|
| 4,203,139 | 5/1980 | Horiuchi | 360/62 |
| 4,266,254 | 5/1981 | Hobrecht et al. | 360/62 |
| 4,354,209 | 10/1982 | Sato et al. | 360/61 |

Primary Examiner—Vincent P. Canney
Attorney, Agent, or Firm—Robert T. Mayer

[57] ABSTRACT

Circuit means for recorders in which the same external pin receives a play signal, a record signal, and a noise reduction signal generated by a user. The circuit means is comprised of a differentiating means for receiving the play and record signals and differentiating between them. A memory means is connected to the differentiating means and stores an indication of the last received of the signals. A first switch means is connected to the memory means and is operable to a first condition to control the play function when the memory means indicates the play signal was last received and to a second condition to control the record function when the memory means indicates the record signal was last received. A second switch means is connected to the external pin receiving the noise reduction signal and generating an ouptut signal to turn on noise reduction means during either the play or record mode.

4 Claims, 4 Drawing Figures

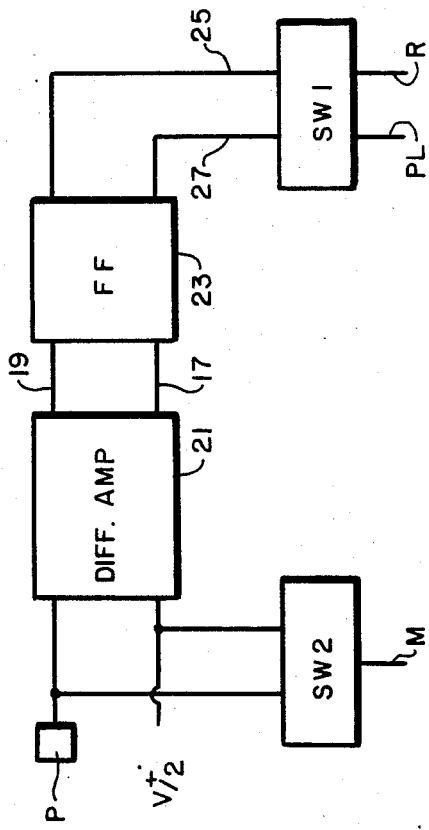
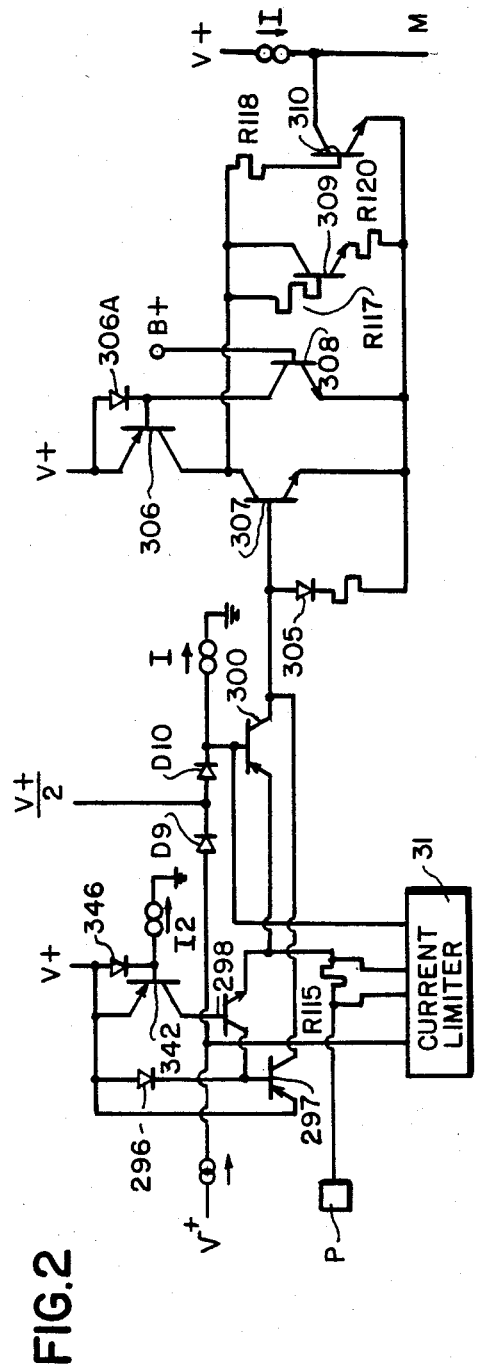
FIG.1
FIG.2

CONTROL CIRCUIT FOR TAPE RECORDERS

This is an invention in circuitry. More particularly, it involves control circuit means for recorders incorporated on integrated circuit chips. At present it is common for such recorder chips to include noise reduction circuitry, such as, Dolby B type noise reduction.

It is an object of the present invention to provide simpler control circuit means for tape recorders.

One of the features of the invention is that it uses the same external integrated circuit control pin for receiving the record signal, the play signal and noise reduction on-off control signals generated by a user.

Another feature of the invention is that it enables one external integrated circuit control pin to be used for selecting any of four modes of operation, namely, record mode with noise reduction on or off and play mode with noise reduction on or off.

An advantage of the invention is that it requires one less external pin than previous recorder signal processor circuit chips.

According to the invention there is provided integrated circuit means for recorders in which the same external control pin receives both the play signal and the record signal generated by a user comprising a differentiating means receiving said signals and differentiating between them; memory means connected to said differentiating means and storing an indication of the last received of the signals; and first switch means connected to said memory means and operable to a first condition to control the play function when the memory means indicates the play signal was the last received and to a second condition to control the record function when the memory means indicates the record signal was the last received.

Other objects, features and advantages of the invention will be apparent from the following description and appended claims when considered in conjunction with the accompanying drawing in which:

FIG. 1 is block diagram of the elements of the invention;

FIG. 2 is a schematic of circuitry of one of the elements of the invention;

Figure 4:
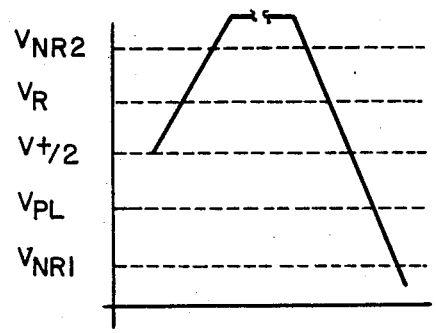
FIG. 4 is a diagram showing variations in voltage as a function of time.

Referring to FIG. 1 there is shown an external pin P of an integrated circuit chip incorporating the present invention. Pin P is connected to one input of a differential amplifier 21. The other input of differential amplifier 21 is connected to a biasing voltage source $V+/2$. Available for application to pin P is a voltage which can be varied as that shown in FIG. 4. Upon operation of the record button of a tape recorder in which the present integrated circuit is connected, the voltage on pin P rises smoothly from $V+/2$ to $V_R$ (FIG. 4). This selects the record mode with noise reduction off. Differential amplifier 21 responds to this change in voltage on pin P and produces signals on lines 17 and 19 which cause flip flop 23 to set to the record condition. This produces a signal along line 25 which causes switch SW1 to mode without noise reduction.

Upon operation of the play button of a recorder in which the present integrated circuit is connected, the voltage on pin P is reduced smoothly from $V+/2$ to $V_{PL}$ (FIG. 4). This selects the play mode with noise reduction off. This change in voltage on pin P causes differential amplifier 21 to produced outputs on lines 17 and 19 which transfer flip flop 23 to the play condition. This produces a signal along line 27 which causes switch SW1 to produce an output along line PL for selection of the play mode without noise reduction.

Also shown in FIG. 1 is a switch SW2 which operates to provide outputs on line M to turn the noise reduction on and off. The transitions from on to off and vice-versa are smooth, relatively slowly varying ones whereby a click-free operation is achieved.

FIG. 2 shows circuitry which provides the operation of switch SW2. In operation as the voltage on pin P increases above the value of $V_{NR2}$ (FIG. 4) to indicate that the record function with noise reduction has been selected, transistor 300 starts to conduct effectively. This causes conduction through diode 305 and turns transistor 307 on. When this happens transistors 309 and 310 slowly stop conducting. This causes transistor 310 to go out of saturation and slowly changes the voltage on line M from a logic "0" to a logic "1".

Alternatively, when the play mode with noise reduction is selected the voltage on pin P is reduced pelow the value of $V_{NR1}$ (FIG. 4) and transistor 298 starts to conduct effectively. This turns transistor 297 on to conduct effectively, which causes current to flow through diode 305. Again, transistor 307 is slowly turned on draining current from transistors 309 and 310 causing the voltage on line M again to change from a logic "0" to a logic "1".

Pin B+ is connected to an appropriate bias voltage for the base of transistor 308. Current limiter 31 is used to limit the current through transistors 298 and 300 by debiasing and biasing their respective bases as is desired.

The signal on line M can be restored to a logic "0" to turn off the noise reduction means (not shown) in either the play or record mode by varying the voltage on pin P to above the value $V_{NR1}$ or below the value $V_{NR2}$, respectively. This turns off transistor 298 or 300 from effective conduction, respectively, and diode 305 ceases to conduct. Hence transistor 307 is turned off and transistors 309 and 310 go into saturation.

Figure 3:
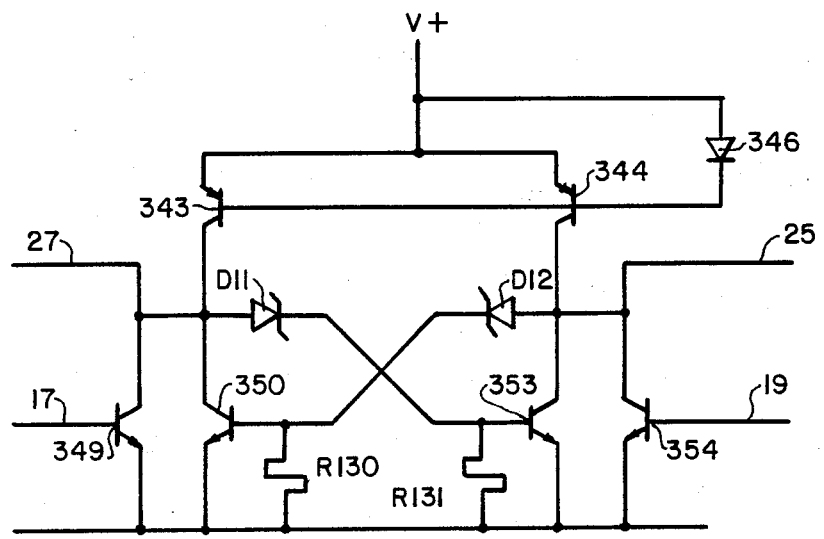
FIG. 3 is a schematic of circuitry of another of the elements of the invention.

FIG. 3 shows the presently preferred embodiment of flip-flop 21. Upon the selection of the play mode by a user, the voltage on line 19 goes high and that on 17 goes low. This turns transistors 354 on causing the signal on line 25 to go low. Transistor 350 goes off raising the voltage on line 27 which causes transistor 353 to turn on to cause flip-flop 21 to store an indication that the play mode was last selected.

Conversely, if the record mode is selected the voltage on line 17 goes high and that on 19 goes low. This turns transistor 349 on causing the signal on line 27 to go low. Transistor 353 goes off raising the voltage on line 25 which causes transistor 350 to turn on to cause flip-flop 21 to store an indication that the record mode was last selected.

Transistors 343 and 344 serve as active load current sources. The use of Schottky diodes D11 and D12 in conjunction with positive feedback gain elements 350 and 353 give a relatively fast operation and the necessary level shift for lines 25 and 27, respectively.

It should be apparent that various modifications of the above will be evident to those skilled in the art and that the arrangement described herein is for illustrative purposes and is not to be considered restrictive.

What is claimed is:

1. Circuit means for recorders in which the same external pin receives a play signal, a record signal and a noise reduction signal generated by a user comprising
   (a) differentiating means receiving said play and record signals and differentiating between them;
   (b) memory means connected to said differentiating means and storing an indication of the last received of said play and record signals;
   (c) first switch means connected to said memory means and operable to a first condition to control the play function when the memory means indicates said play signal was the last received, and to a second conditon to control the record function when the memory means indicates said record signal was the last received; and
   (d) second switch means connected to said external pin receiving said noise reduction signal and generating an output signal to turn on noise reduction means during either the play or the record function.

2. Circuit means according to claim 1, wherein said second switch means in switching to said first condition produces an output signal which varies from a logic "0" to a logic "1".

3. Circuit means according to claim 2, wherein said same pin also receives a signal to turn off said noise reduction means in either the play or record mode and said second switch means is operable to a second condition in response to said signal.

4. Circuit means according to claim 3, wherein said second switch means in switching to said second condition produces an output signal which varies from a logic "1" to a logic "0".

* * * * *